No. 818,462.
PATENTED APR. 24, 1906.
T. W. McNALLY.
HAIR CLIPPER.
APPLICATION FILED SEPT. 16, 1905.
2 SHEETS—SHEET 1.
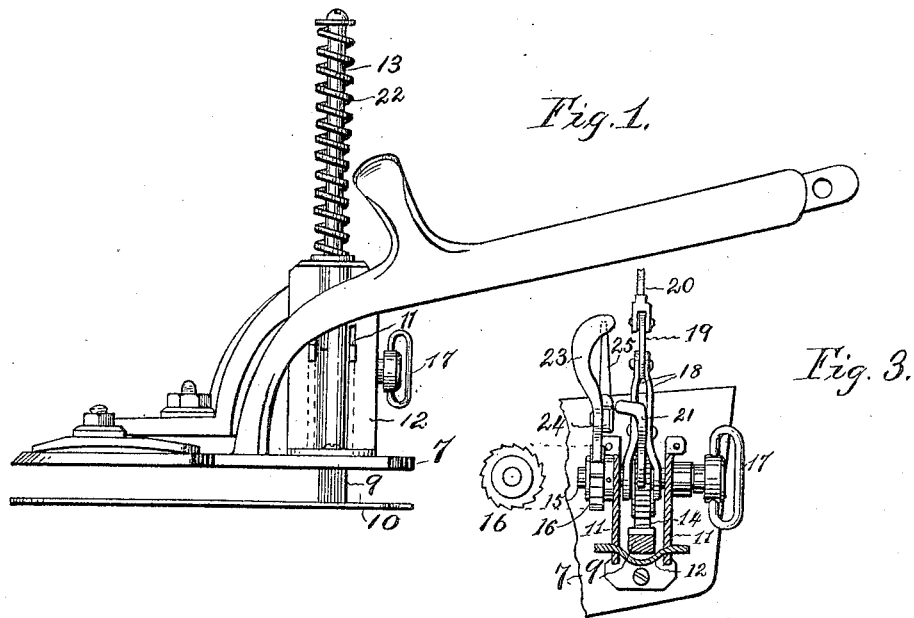
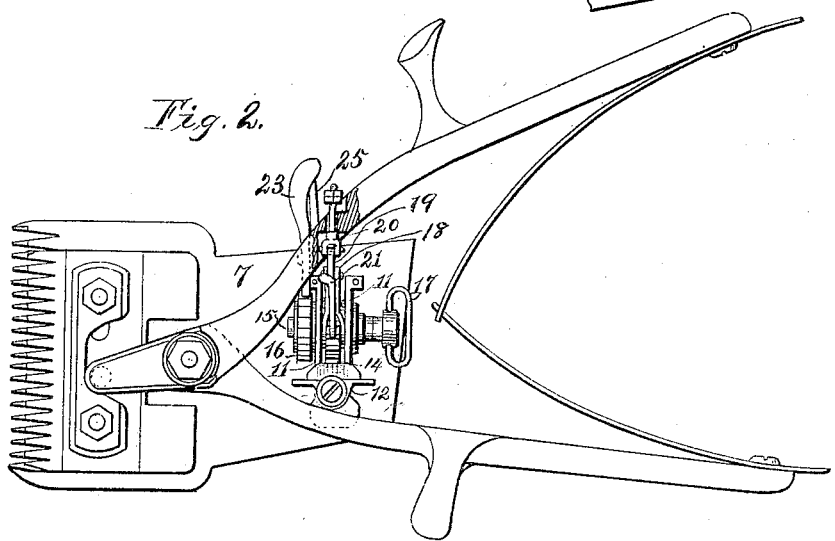
Witnesses
Henry T. Bright
C. E. Webb
Thomas W. McNally
Inventor
by
Eugene W. Johnson
Attorney No. 818,462. PATENTED APR. 24, 1906.
T. W. McNALLY.
HAIR CLIPPER.
APPLICATION FILED SEPT. 16, 1905.
2 SHEETS—SHEET 2.
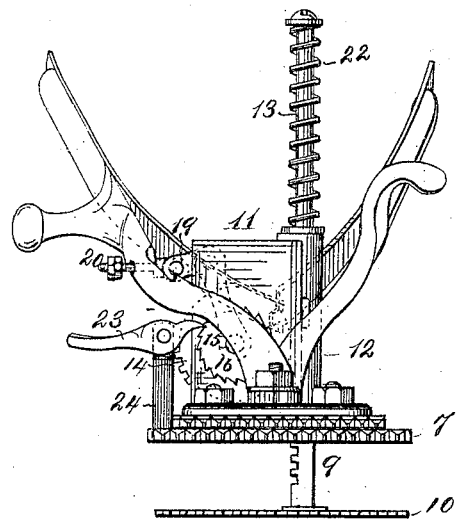
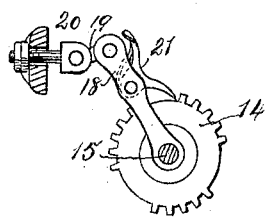
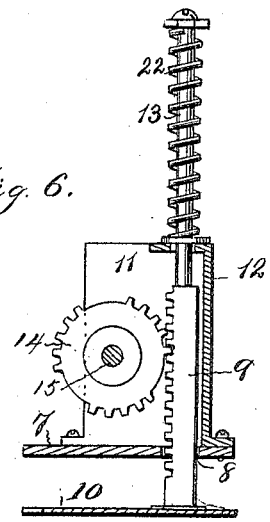
Witnesses
Henry T. Bright
C. E. Webb
Thomas W. McNally
Inventor
By Eugene W. Johnson
Attorney

UNITED STATES PATENT OFFICE.

THOMAS W. McNALLY, OF BRISTOL, PENNSYLVANIA, ASSIGNOR OF ONE-THIRD TO HUGH B. NELSON, OF BRISTOL, PENNSYLVANIA.

HAIR-CLIPPER.

No. 818,462.   Specification of Letters Patent.   Patented April 24, 1906.

Application filed September 16, 1905. Serial No. 278,747.

*To all whom it may concern:*

Be it known that I, THOMAS W. McNALLY, a citizen of the United States of America, residing at Bristol, in the county of Bucks and State of Pennsylvania, have invented certain new and useful Improvements in Hair-Clippers; and I do hereby declare the following to be a full, clear, and exact description of the invention, such as will enable others skilled in the art to which it appertains to make and use the same, reference being had to the accompanying drawings, and to figures of reference marked thereon, such drawings forming a part of this specification.

My invention relates to certain new and useful improvements in hair-clippers, the purpose thereof being to provide hair-clippers of the type shown with a gage that may be adjusted by moving the handle that reciprocates one of the cutting-blades, and in carrying my invention into effect the hair-clipper is provided beneath the fixed or lower cutter or blade with an adjustable gage, such gage having a rack-bar that engages with a toothed wheel that is suitably supported so that it may be turned by a pawl carried by toggle-links that are connected to the movable handle and to the shaft that carries the toothed wheel, so that when the movable handle is oscillated beyond its normal range of movement the pawl will turn the gear-wheel and move the gage away from the fixed cutter. The invention also includes means for locking the gage, means for manually moving the same toward the fixed plate or cutter of the clippers, and in certain details of construction, as will be hereinafter set forth, and specifically pointed out in the claims.

In the accompanying drawings, which illustrate my invention applied to hair-clippers of ordinary construction, Figure 1 is a side elevation in which the gage is shown as moved beyond the fixed blade of the clippers. Fig. 2 is a plan view. Fig. 3 is a plan view, partly in section, of the mechanism carried by the fixed plate of the clippers. Fig. 4 is a front elevation, and Figs. 5 and 6 are detail views.

The hair-clippers shown are of the usual type, and to adapt my invention thereto the fixed or lower plate 7 is provided with an opening or aperture 8, through which passes a rack-bar 9, the gage-plate 10 being securely attached to the lower end of the rack-bar. The gage-plate 10 is of substantially the same shape as the fixed plate of the clippers. This gage-plate may have on its front edge teeth which correspond with the teeth on the front edge of the fixed or lower plate, or the gage-plate may have a straight edge, and the upper portion of the rectangular bar 9 is rounded.

A casing is attached to the upper side of the plate 7, such casing being made up of similar front and end plates 11 11 and a side plate 12, such plates being connected and provided with projecting portions through which may pass screws or rivets for attaching the casing to the upper side of the plate or fixed blade 7 of the clippers. The upper portion of the plate 12 is bent sidewise and has therethrough an aperture for the rounded upper part 13 of the bar 9, such bar having on one face rack-teeth.

The plates 11 of the casing are provided with openings that serve as bearings for a shaft 15, such shaft carrying between the plates a mutilated gear-wheel 14, and to the forward end of the shaft is a ratchet-wheel 16 and on the rear end a key 17. The shaft 15 on each side of the gear-wheel 14 is engaged by the links of a toggle that consists of a pair of links 18, a single link 19, and a bolt 20, that is attached to the link 19 and to the pivoted handle of the clippers. The links 18 have pivoted thereto a spring-actuated pawl 21 for engagement with the mutilated gear-wheel 14, and the stem of the bolt 20 is of such length that it may have a limited amount of reciprocatory play in the opening through the handle. The bolt 20, as shown, has a slotted head and shoulders to limit its movement in one direction, and its threaded end carries a check and a lock-nut, so that the range of movement of the toggle may be varied, the adjustment being made to suit the operator, as some will impart in use a greater range of movement to the pivoted handle than others, the purpose being to admit of the clippers being used without imparting movement to the mutilated gear-wheel 14, and when it is desired to change the position of the gage the movable handle is moved toward the fixed handle to a greater extent than is practiced when simply cutting hair. The slip of the pawl 21 in the toothless portion of the wheel 14 and the play of the bolt 20 will admit of the pivoted handle being operated effectively without moving the gear-wheel and the gage.

The gear-wheel 14 has teeth that engage with the rack on the bar 9, and between each series of teeth is a vacant space upon which the pawl 21 will slide. The spaces are of such dimensions that at least one or more of the teeth will at all times engage the rack-bar and hold the same against movement.

The upper portion of the combined rack and guide bar is encircled by a spiral spring 22, which bears against washers on the end of the bar 13 and upon the casing. The spring exerts a pressure that tends to move the gage toward the fixed cutter-plate, and movement of the gage in such direction is resisted by the ratchet-wheel 16, that is engaged by a pawl 23, such pawl being pivoted to a post 24, that projects from the fixed plate of the clippers and has in addition to the pawl 23 a spring 25, that normally holds the pawl in engagement with the ratchet-wheel.

The construction of the mutilated gear-wheel provides for several adjustments of the gage-plate, and the consecutive adjustments of the gage may be made by merely imparting an extra movement to the pivoted handle of the clippers.

The spring 22 is of sufficient strength to draw and hold the gage against the fixed plate of the clippers, and when it is desired to so place the gage or to make an intermediate adjustment the operator will release the pawls, the key being present for the purpose of turning the shaft 15, to which the mutilated gear-wheel 14 and the ratchet-wheel 16 are attached, in case the parts should jam or otherwise lock.

It will be noted from the foregoing that the purpose of the device shown is to provide hair-clippers with means whereby the gage-plate may be adjusted from the fixed plate of the clipper without the operator moving his hand from the operating-handles, and the construction of the means for accomplishing the end in view may be varied to suit the particular make of clippers to which my invention is applied, and, Without limiting myself to the particular construction or arrangement of the parts shown, I claim—

1. In combination with hair-clippers having a movable handle for actuating the reciprocating blade of the clippers, of a gage maintained to be movable away from the blades of the clippers, and means for moving the gage operatively connected with a movable part of the clippers and operated thereby when more than the minimum movement is imparted to such movable part.

2. The combination with hair-clippers of a gage-plate connected thereto by a bar, a spring that engages the bar and exerts a tendency to move the gage toward the cutters of the clippers, means for moving the gage away from the cutters to which a rotary movement is imparted from one of the handles of the clippers; when a movement greater than normal is imparted to the handle and means for restraining movement of the gage against the action of the spring.

3. In combination with hair-clippers of the type shown, a gage-plate having a rack-bar, a mutilated gear-wheel maintained to engage the rack-bar, a toggle connected to one of the handles of the hair-clippers and to the shaft of the mutilated gear-wheel, a pawl carried by the toggle for engagement with the mutilated gear-wheel, and a ratchet-wheel for holding the shaft against movement, substantially as shown and for the purpose set forth.

4. In combination with hair-clippers, a gage-plate, a rack-bar attached thereto, a shaft having thereon a mutilated gear-wheel for engagement with the rack-bar, links connected to one of the handles of the hair-clippers and to the shaft of the gear-wheel, a pawl carried by the links such pawl being adapted to move the gear-wheel when the handle is moved beyond its normal range of movement, a pawl and ratchet for locking the shaft carrying the mutilated gear-wheel against movement in one direction, and a spring that encircles the bar carried by the gage, substantially as shown.

In testimony whereof I affix my signature in the presence of two witnesses.

THOMAS W. McNALLY.

Witnesses:
HOWARD R. THORNTON,
WILLIAM YOUNG.